Aug. 14, 1928. 1,680,613
H. HENNEBUTTE ET AL
CARBONIZING APPARATUS
Filed Dec. 28, 1923 2 Sheets-Sheet 2
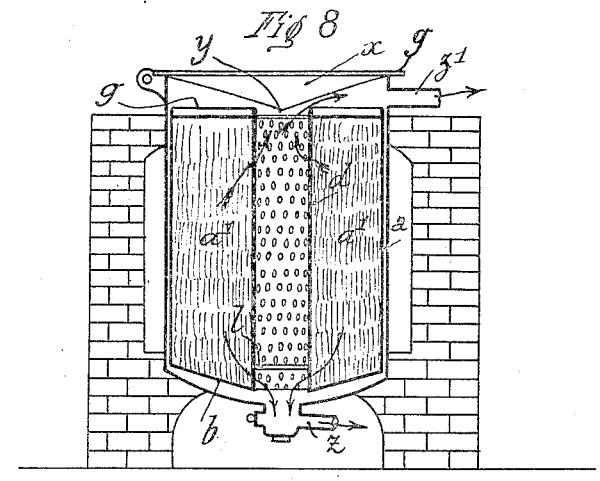
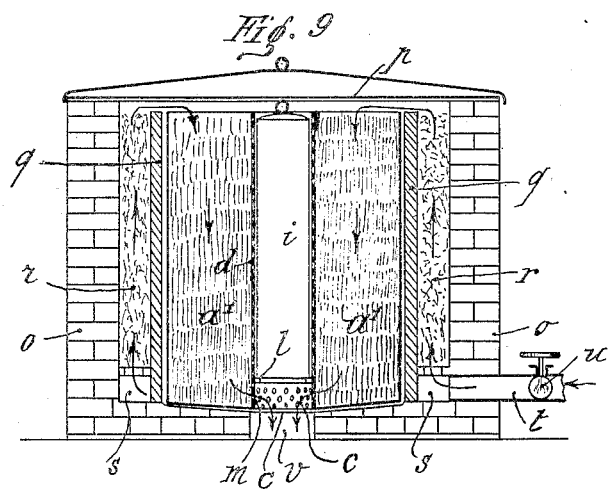
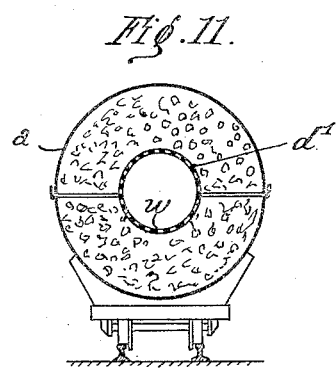
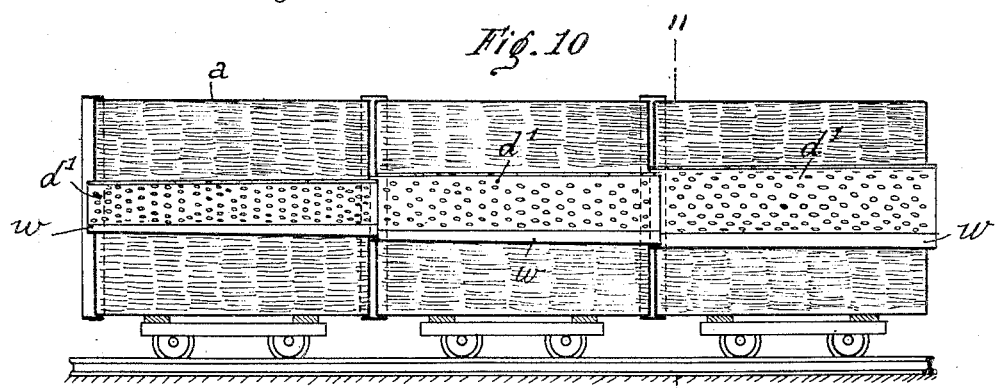

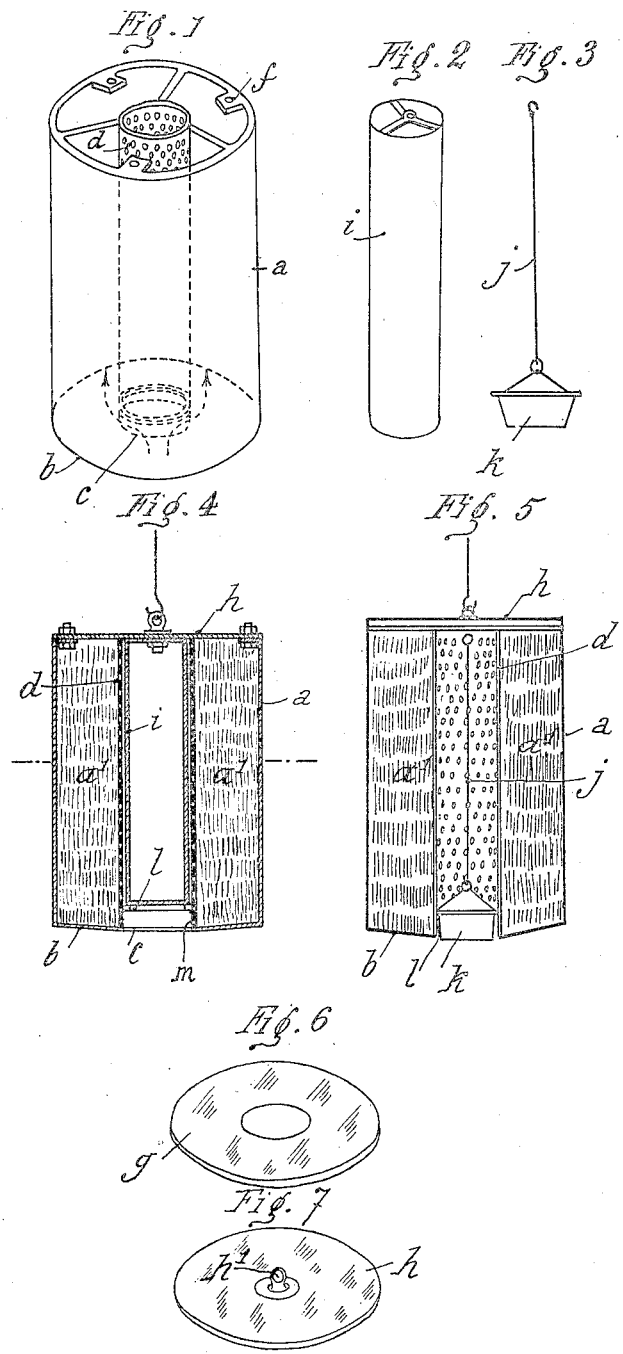

Patented Aug. 14, 1928.

1,680,613

UNITED STATES PATENT OFFICE.

HENRI HENNEBUTTE AND EDOUARD GOUTAL, OF PARIS, FRANCE.

CARBONIZING APPARATUS.

Application filed December 28, 1923, Serial No. 683,259, and in France January 3, 1923.

As a general rule, wood is carbonized in a closed vessel in the following manner. The combustible or carbonizable substance is placed in metallic baskets which are then disposed within vertical, horizontal or inclined retorts in which it is acted upon by heat. The resulting gas and vapor will necessarily be raised, by direct contact with the hot walls, to a much higher temperature than the one at which they were formed, and will thus be more or less decomposed.

Our invention has for its object to obviate all such decomposition by the use of special devices by which the gas, as well as the products which are vaporized during the pyrogenation process, are caused to issue through a central conduit situated at a considerable distance from the hot walls.

The following description with reference to the appended drawings which are given by way of example sets forth various embodiments of our invention.

Fig. 1 is a perspective view of a basket arranged in accordance with the said invention.

Fig. 2 is a like view of a closing cylinder which is placed at the centre of the basket.

Fig. 3 shows a metallic plug.

Fig. 4 is a sectional view of the basket provided with the said closing cylinder.

Fig. 5 is a like view of the basket with the metallic plug.

Figs. 6 and 7 show respectively an annular cover and a plain disc cover.

Fig. 8 is a vertical section of the basket disposed in the carbonizing retort.

Fig. 9 is a like view of the basket within the combined drying and regenerating device.

Fig. 10 shows the arrangement of horizontal baskets upon trolleys.

Fig. 11 is a section on the line 11—11 of Fig. 10.

The said apparatus comprises firstly a basket or container consisting of a cylindrical receptacle $a$ having plain walls of sheet iron, copper or other metal, whereof the bottom $b$, which is also plain, has at the centre an aperture $c$. A perforated cylinder $d$ is mounted in coaxial position, and it cooperates with the circular aperture $c$, thus forming a sort of internal collecting conduit.

The whole device, which can be made in one or more parts, is suspended by any suitable attaching means.

A plain cover $h$, Fig. 7, which may be provided for example with a coupling ring $h^1$, assures the closing of the upper part upon removal from the oven or retort.

The said basket comprises the following additional accessories. A cylinder $i$, Fig. 2, with plain walls and bottom and hence fluid tight, may be placed in the perforated cylinder $d$, Fig. 1. A metallic plug $k$, Fig. 3, is placed, upon removing from the oven, at the lower part of the perforated cylinder or conduit $d$, Fig. 5, and is provided with a rod $j$ with a hook for handling the same. An annular cover $g$ or a plain cover $h$ may be placed upon the top of the said basket so as to close the whole upper part or only the annular portion containing the charge.

The following operations can be carried out with the said apparatus.

A. The rapid drying of wood before placing it in the distilling furnace, with recovery of the heat produced or stored up during the subsequent operations of carbonizing the substances which were previously treated.

B. Carbonization with evacuation of the gasified or vaporized products at the part situated farthest from the hot walls.

C. Discharge from the oven with the minimum combustion and with recovery of the heat stored up in the carbonized mass.

A. Drying.

The basket $a$ having been filled in its annular part with the combustible to be carbonized, one places in the internal perforated cylinder $d$ the cylinder $i$ with fluidtight walls and bottom which comes into contact with the stop-piece $l$, Fig. 5. In this manner the gas can pass only through the lower part $m$, Fig. 4, and through the annular portion of the basket containing the combustible.

After placing the whole device in a chamber serving in an alternate manner as a drying space and a regenerating chamber and whose walls may be heated from the exterior or may more simply be of solid construction and insulated, one suitably introduces hot gas obtained from the furnaces of the carbonizing apparatus or from any other source. The gas passing through the charge sets up and furthers the drying, this action being facilitated by cutting or breaking the wood into smaller pieces, and by a greater heating of the walls of the chamber during the operations of discharge and extinguishing which were previously effected. For this purpose one may employ the combined drying and regenerating device shown in section in Fig. 9.

This apparatus, as its name indicates, is intended for use successively as a regenerating chamber for the accumulation of heat and as a drying chamber, and consists of a brickwork structure $o$ provided with a cover $p$ and having therein a good conducting circular wall $q$ leaving between the latter and the brickwork wall of the chamber an annular space $r$ which is filled with piled-up material of any kind serving as a heat accumulator. Through this filling material is circulated the hot gas which is admitted into the annular flue $s$ formed at the lower part of the furnace and provided with a gas inlet conduit $t$ having therein the valve $u$. The gas leaving the said filling material will circulate as shown by the arrows through the annular mass $a^1$ contained in the basket $a$; the gas is discharged through the aperture $v$ at the lower part. The said filling material may contain baffles obliging the gas to circulate through the whole regenerating device irrespectively of the speed of flow.

The said preliminary drying offers a great advantage, inasmuch as it reduces the volume of the aqueous product of distillation obtained during the carbonizing operation B, this admitting the concentration and rectifying of the by-products in a more ready and economical manner, while making use of the heat lost during the discharge and the cooling of the carbonized mass. This utilization will be a maximum if the speed of the gas flow is regulated in accordance with its hygrometric state as registered at the outlet.

B. Carbonizing.

After drying the material, the basket is brought into the retort or oven used to effect the carbonizing, the closing cylinder $i$ having been removed. In the case of a retort with vertical walls as shown in Fig. 8, in order to carry out the distillation in both directions, the cover $g$ is disposed so as to cover only the annular part containing the charge. If it is desired to operate in the downward direction only, one uses the cover $h$ closing the whole top.

At the top of the retort is mounted a cover $x$ with tapered bottom, Fig. 8, allowing the condensed products to drain to the lowest point $y$ and to drop thence through the central passage or perforated cylinder $d$ without undergoing pyrogenic decomposition.

It is not essential in the operations effected by ascent or descent, to cover the top of the charge by the annular cover $g$. In this case the gasified products will be directly evacuated either through the conduit $z$ or through the conduit $z^1$ without having been placed in contact with the heating walls.

C. Discharge of the material.

When the carbonizing is completed, the retort is opened, and one places in the perforated cylinder the plug $k$ which rests upon the stop piece $l$, Fig. 5. The plain cover $h$ is then placed on the basket and entirely closes the top thereof. The basket is then removed and placed in the said drying and regenerating chamber, whereof two or more can be used with each retort or oven. This device can be constructed as shown in Fig. 9, and in this case the valve $u$ is closed to prevent the inlet of hot gas. In this manner the hot combustible is protected against direct contact with the air, and it gives up its heat to the walls $q$ of the regenerating device which will restore this heat during the succeeding operation in which the device is used as a dryer.

When the carbonizing furnaces consist of inclined or horizontal retorts, it is preferable to use baskets in which the central perforated cylinder $d^1$ has a very slight taper, Fig. 10, for the purpose to be further indicated, and is provided with a collecting trough $w$ for the outflow of the condensed products towards a collecting device, not shown, which is placed at the non-heated end of the retort.

In the case of horizontal retorts adapted to contain a plurality of removable baskets whereof the inner perforated cylinders $d^1$ have increasing sections, the ends thereof being in adjacent position so as to fit together, Fig. 10; said baskets are mounted upon trolleys serving to handle the same for placing them in the ovens and the drying and dehydrating apparatus, and for the removal therefrom.

Obviously, the several devices above mentioned are given solely by way of example and are susceptible of detail modifications without departing from the spirit of the invention.

What we claim is:—

A drying and carbonizing apparatus of the type described comprising in combination, a metal cylinder, a second metal cylinder concentrically disposed therein, the cylinders forming an annular carbonizing chamber between them, an inturned flange on the first mentioned cylinder for closing one end of said chamber, perforations extending through the wall of said second metal cylinder over substantially the whole length thereof, a detachable cover for the ends of said cylinders opposite said flange for use during the carbonizing operation, an aunular abutment on the interior of said second metal cylinder adjacent to but spaced from the end thereof that is adjacent said flange, a complementary detachable tube adapted to be inserted in said second metal cylinder and to prevent substantial passage of gas through the perforations between said abutment and the end of the cylinder remote therefrom, and a detachable flanged plug adapted to close one end of said second metal cylinder.

In testimony whereof we have signed this specification.

HENRI HENNEBUTTE.
EDOUARD GOUTAL.